United States Patent [19]

Ubukata et al.

[11] 4,057,200
[45] Nov. 8, 1977

[54] EMERGENCY LOCKING RETRACTOR FOR VEHICLE SEAT BELTS

[75] Inventors: Susumu Ubukata; Shozo Iyoda; Kenji Oda, all of Nagoya, Japan

[73] Assignee: Susumu Ubukata, Nagoya, Japan

[21] Appl. No.: 704,104

[22] Filed: July 9, 1976

Related U.S. Application Data

[62] Division of Ser. No. 562,336, March 26, 1975, abandoned.

[30] Foreign Application Priority Data

| June 1, 1974 | Japan | 49-62147 |
| July 15, 1974 | Japan | 49-81487 |
| Sept. 26, 1974 | Japan | 49-111211 |

[51] Int. Cl.² .................. A62B 35/02; B65H 75/48
[52] U.S. Cl. ..................................... 242/107.4 A
[58] Field of Search ............... 242/107.4 R–107.4 E; 297/388; 280/744–747

[56] References Cited

U.S. PATENT DOCUMENTS

| 3,819,126 | 6/1974 | Stoffel | 242/107.4 A |
| 3,850,383 | 11/1974 | Lewis | 242/107.4 A |
| 3,942,739 | 3/1976 | Torphammar et al. | 242/107.4 A |

FOREIGN PATENT DOCUMENTS

| 1,430,422 | 11/1968 | Germany | 242/107.4 A |
| 1,817,383 | 7/1969 | Germany | 242/107.4 A |

Primary Examiner—Stanley N. Gilreath
Assistant Examiner—John M. Jillions

[57] ABSTRACT

A seat belt retractor incorporates a fail-safe locking mechanism that is actuated by vehicle acceleration to lock a retractor drum against rotation in the belt unwinding direction. A pair of locking wheels are arranged coaxially with the drum for simultaneous rotation therewith, and a detent movable into and out of engagement with both locking wheels is biased, by biasing means such as a spring, into engagement therewith. Normally, the detent is restrained from engagement with the locking wheels against the force of the biasing means by an actuator associated with an inertial element constituting a part of acceleration sensing means. Upon displacement of the inertial element from its normal position of rest, the actuator permits the detent to move into engagement with the locking wheels by the force of the biasing means.

6 Claims, 19 Drawing Figures

EMERGENCY LOCKING RETRACTOR FOR VEHICLE SEAT BELTS

This is a division of application Ser. No. 562,336 filed Mar. 26, 1975, now abandoned.

BACKGROUND OF THE INVENTION

This invention relates generally to seat belt assemblies of vehicles, particularly motor vehicles, that are designed to minimize the risk of bodily harm in an accident or emergency. More specifically, the invention deals with an emergency locking seat belt retractor of the type responsive to vehicle acceleration. It should be understood that the term "acceleration" is herein used generically, to mean both "positive" and "negative" accelerations as well as a sudden change in direction of movement of the vehicle.

Emergency locking retractors have been known and used in conjunction with vehicle seat belt assemblies. A retractor of this class usually includes a drum or reel on which there is wound a storage portion of the seat belt and which is spring biased to rotate in the belt winding direction. Normally, therefore, the occupant of the vehicle seat can wear the belt under tension while being relatively free to move away from or back to his seat. The retractor in question also includes a locking mechanism which is actuated automatically, as in the event of collision, rollover, or any abrupt stopping of the vehicle, to lock the drum against rotation in the belt unwinding direction.

In the known mechanical emergency locking retractor of the type responsive to vehicle acceleration, the force required to actuate the locking mechanism has been derived directly from a displaceable inertial element constituting the principal part of acceleration sensing means. A problem accompanying such prior art arrangement is that the locking mechanism becomes completely inoperative in the event that the inertial element is hurled away or otherwise becomes lost from its housing or support structure as a result of, for example, the collision of the vehicle. This disadvantage is all the more serious because the acceleration sensing means with its displaceable inertial element is more susceptible to the effects of shocks than the other part or component of the vehicle.

SUMMARY OF THE INVENTION

It is therefore a primary object of this invention to provide an emergency locking seat belt retractor incorporating a fail-safe locking mechanism which can be positively actuated by vehicle acceleration as sensed by means including an inertial element, and which, once actuated, will keep locking the retractor even if the acceleration sensing means should suffer such damage as to result in the loss of the inertial element.

Another object of the invention is to provide an emergency locking seat belt retractor in which the force required to actuate the locking mechanism is not supplied by the inertial element of the acceleration sensing means but by separate biasing means, so that the locking mechanism can be actuated promptly regardless of the degree of acceleration to which the vehicle is subjected.

A further object of the invention is to provide an emergency locking seat belt retractor including acceleration sensing means so adapted that the inertial element is displaced from its normal position of rest only in response to vehicle accelerations in the horizontal direction, so that the locking mechanism will not be actuated by the ordinary vertical jolts of the vehicle.

A further object of the invention is to provide acceleration sensing means adapted to minimize noise production and wear or damage of its working parts.

A still further object of the invention is to provide an emergency locking seat belt retractor in which a drum having a storage portion of the seat belt wound thereon is so arranged as to be rotatable about a vertical axis in order that the belt may be more smoothly paid out of, or wound back into, the retractor.

With all these and other objects in view, this invention provides an emergency locking retractor for a vehicle seat belt which includes a rotatable drum having one end of the seat belt anchored thereto for winding and unwinding the same and biased to rotate in the belt winding direction. The drum has at least one, preferably two, locking wheel rotatable simultaneously therewith. The locking wheel is associated with a detent constrained to movement between an operative position, where the detent engages the locking wheel to lock the drum against rotation in the belt unwinding direction, and an inoperative position, where the detent disengages the locking wheel to permit the rotation of the drum in either direction. Biasing means is provided to bias the detent from its inoperative to operative position.

The retractor has also acceleration sensing means including an inertial element displaceable from its normal position of rest in response to vehicle acceleration. Normally, the inertial element causes, via an actuator, the detent to be held in its inoperative position against the bias of the biasing means. Upon displacement of the inertial element the actuator permits the detent to move from its inoperative to operative position under the bias of the biasing means thereby locking the drum against rotation in the belt unwinding direction.

Typically, the biasing means may take the form of a spring, but the detent can also be caused to be biased toward its operative position by its own weight. It should be noted that in either arrangement the force of the inertial element due to its displacement is not used to move the detent from its inoperative to operative position. The drum can therefore be held locked even in the event of such excessive vehicle acceleration as to result in the loss of the inertial element or in similar damage of the acceleration sensing means.

The features which are believed to be novel and characteristic of this invention are set forth in particular in the appended claims. The invention itself, however, both as to its organization and mode of operation, together with further objects and advantages thereof, will become apparent in the course of the following detailed description of several preferred embodiments, which is to be read in connection with the accompanying drawings in which like reference numerals designate like parts throughout the several views.

DETAILED DESCRIPTION

Figure 1:
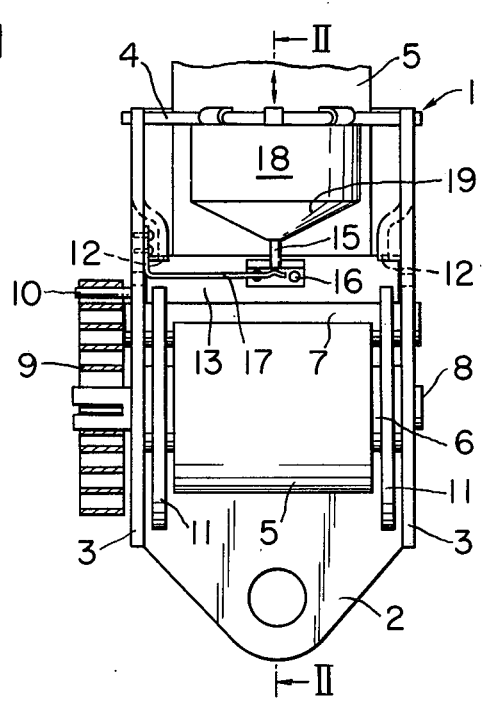
FIG. 1 is a front elevational view of an emergency locking seat belt retractor constructed in accordance with the novel concepts of this invention, the view including a spiral spring shown in vertical section through its axis.
Figure 2:
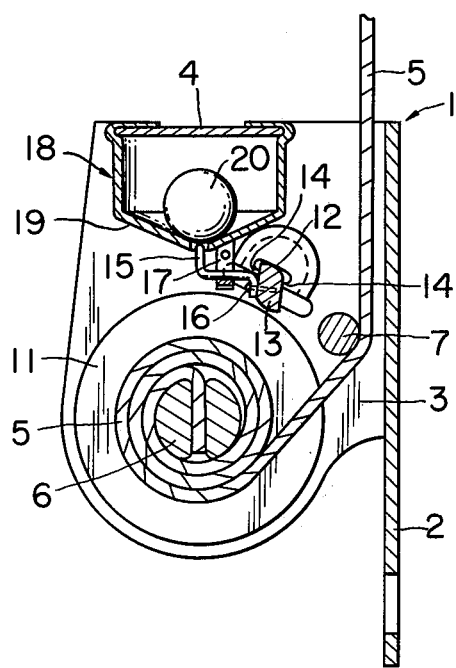
FIG. 2 is a side view in section taken along the plane of line II—II in FIG. 1 as viewed in the arrow direction.

The emergency locking seat belt retractor shown in FIGS. 1 and 2 and constituting a typical embodiment of this invention includes a frame 1 to be secured to a suitable part of a vehicle. The retractor frame 1 comprises a vertical back plate 2, a pair of side flanges 3 formed integrally with and extending perpendicularly from the two lateral edges of the back plate 2 and arranged in confronting parallel relationship to each other, and a horizontal top plate 4 extending between and fixed to the top edges of the side vertical members 3.

A strap, webbing or the like (hereinafter referred to as the "seat belt" or simply as the "belt") 5 adapted to secure a person to the seat in the vehicle in the well known manner is anchored at one of its ends to a drum 6 and extends out of the retractor via a guide rod 7 fixedly supported between and by the pair of side flanges 3 of the retractor frame 1. The drum 6 is fixedly mounted on a shaft 8 extending between and rotatably journaled in the side flanges 3. One end of the drum shaft 8 projects outwardly through one of the side flanges 3 and is fixedly connected to the inner end of a spiral spring 9 shown in vertical section in FIG. 1. The other outer end of the spiral spring 9 is anchored on a pin 10 projecting from and fixed to the side flange 3. The drum 6 is thus biased, when the spring 9 is in wound or energised state, to rotate in a direction such that the seat belt 5 tends to be wound therearound, that is, to withdraw into the retractor.

A pair of locking wheels 11 having smooth circumferential surfaces are coaxially fixed to the drum 6 on opposite sides thereof for unitary rotation therewith. These locking wheels 11 constitute parts of the emergency locking mechanism that locks the drum 6 against rotation in the belt unwinding direction in response to vehicle acceleration during an emergency, as hereinafter described.

A pair of abutments 12 are formed respectively above the locking wheels 11 as by indenting or joggling parts of the side flanges 3 toward each other. As will be apparent from a consideration of FIG. 2, each abutment 12 is generally arranged to have a surface parallel to the tangential plane through the nearest point of the corresponding locking wheel 11 and at a suitable distance from its circumference.

A detent 13 extends horizontally between the side flanges 3 so as to be pivotable about an axis extending in its longitudinal direction. In this particular embodiment of the invention, the detent 13 takes the form of a friction brake element, having its opposite end portions disposed between the locking wheels 11 and the abutments 12. The detent 13 is restrained from displacement in its longitudinal direction by the side vertical frame members 3 and is limited as to its pivoting motion by a pair of jaws 14 integral with each abutment 12. At least the opposite end portions of the detent 13 have a cross sectional shape, as shown in FIG. 2, such that when pivoted from its illustrated normal or inoperative position in a manner described later, the detent will wedge in between the locking wheels 11 and the abutments 12 thereby frictionally arresting the rotation of the locking wheels and hence of the drum 6 in its belt unwinding direction, which is counterclockwise as viewed in FIG. 2.

An L-shaped actuator rod 15 at one of its ends is screwed or otherwise affixed at 16 to the detent 13 for imparting the desired pivoting motion to the latter between its inoperative and operative positions. A leaf spring 17 projecting from the one of the side flanges 3 engages the actuator rod 15 to bias the detent 13 toward its operative position where the detent wedges in between the locking wheels 11 and the abutments 12. The force of this leaf spring 17 should be sufficiently great to assure the quick movement of the detent 13 from its inoperative to operative position in response to vehicle acceleration. The leaf spring 17 is also effective in pressing the detent 13 against the abutments 12 and hence for normally holding the same in its inoperative position against its own weight.

Acceleration sensing means generally designated by reference numeral 18 comprises a housing 19 rigidly supported by the top plate 4, and a spherical inertial element 20 of metal or like material contained therein. The housing 19 has a conical bottom with a circular aperture at its vertex which in size is not more than the circle defined by the line of contact along which the inertial element 20 contacts the internal surface of the housing when in its illustrated normal position. Projecting upwardly into the housing 19 through this circular aperture is the other end of the aforesaid actuator rod 15, normally for abutting contact with the inertial element 20. The weight of the inertial element 20 is such that the detent 13 is normally held in its illustrated inoperative position against the bias of the leaf spring 17.

Thus, as long as the inertial element 20 of the acceleration sensing means 18 is resting centrally on the conical bottom of the housing 19, that is, as long as the vehicle is at a standstill or is running normally, the actuator rod 15 is held depressed against the pressure of the leaf spring 17 to retain the detent 13 out of contact with the locking wheels 11. The occupant of the seat is then free to draw the seat belt 5 out of the retractor or to cause the belt to withdraw into the retractor by the force of the spiral spring 9.

When the acceleration sensing means 18 is subjected to an acceleration in excess of a predetermined magnitude, due to a sudden change in movement or direction of the vehicle, the inertial element 20 rolls up the conical bottom of the housing 19. With the inertial element thus displaced from its normal position of rest, the actuator rod 15 is generally swung upward by the force of the leaf spring 17 thereby causing the detent 13 to pivot into contact with the circumferences of both locking wheels 11. The sudden change in movement or direction of the vehicle causes displacement of not only the inertial element 20 but also the wearer of the belt, with the resultant exertion of a force tending to extend the belt from the retractor. The rotation of the drum 6 in its belt unwinding direction, however, is frictionally arrested by the detent 13 wedging in between the locking wheels 11 and the abutments 12.

Upon cessation of the vehicle acceleration the inertial element 20 returns to its normal position of rest by gravity, so that the actuator rod 15 is once again depressed against the force of the leaf spring 17. The detent 13 is thus pivoted out of contact with the circumferences of the locking wheels 11.

In the above described retractor, the leaf spring 17 is used to bias the detent 13 toward its operative position. But the leaf spring 17 may be replaced by suitable magnetic attraction means exerting a magnetic force on the detent 13 to bias the same toward its operative position.

Figure 3:
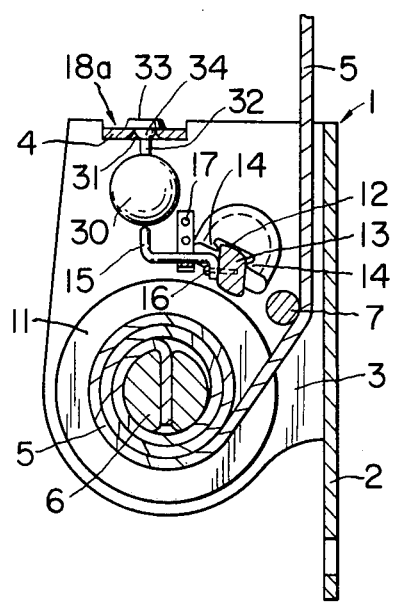
FIGS. 3, 4, and 5 are views similar to FIG. 2 but respectively showing different embodiments of the invention.

The emergency locking seat belt retractor shown in FIG. 3 incorporates a modification of the acceleration sensing means 18 shown in FIGS. 1 and 2. The modified acceleration sensing means 18a is of a pendulum type including a spherical inertial element 30 suspended from the top plate 4 of the retractor frame 1. The top plate 4 has therethrough a hole 31 the bottom edge of which is chamfered to permit the inertial element 30 to swing through a greater angle. The inertial element 30 has an arm 32 connected to a flange 33 via a connector 34 which is relatively neatly fitted in the hole 31. The flange 33, greater in diameter than the hole 31, rests on the top plate 4 to hold the inertial element 30 in position.

The end of the actuator rod 15 remote from the detent 13 is disposed directly below the inertial element 30, in vertically registered relationship to the vertical central axis of the inertial element. As in the preceding embodiment of the invention, the leaf spring 17 projecting from one of the side flanges 3 engages the actuator rod 15 to bias the detent 13 toward its operative position. However, the weight of the inertial element 30 is such that the detent 13 is held in its illustrated inoperative position via the actuator rod 15 against the bias of the leaf spring 17 as long as the inertial element stays in its normal position of rest.

As will be apparent from the foregoing description, the inertial element 30 of the pendulum-type acceleration sensing means 18a swings away from its normal position in the event of a sudden change in movement or direction of the vehicle. The actuator rod 15 is then generally swung upward by the force of the leaf spring 17 thereby causing the detent 13 to pivot into contact with the circumferences of the locking wheels 11. Other details of organization and operation are as above explained in conjunction with FIGS. 1 and 2.

Figure 4:
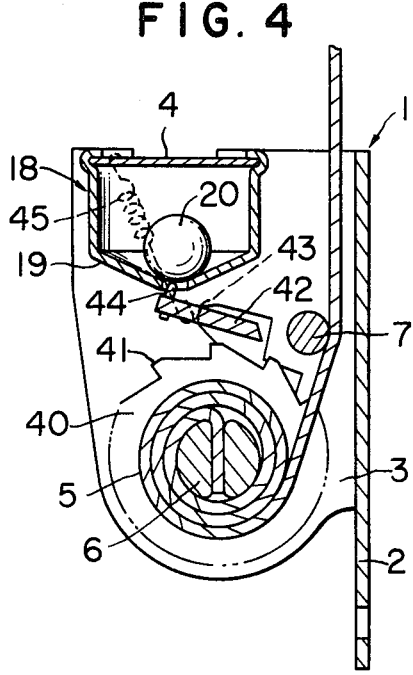

FIG. 4 illustrates another exemplary embodiment of the invention which incorporates a ratchet mechanism for locking the drum 6 against rotation in the belt unwinding direction in response to vehicle acceleration. Thus, in this embodiment, the locking wheels take the form of ratchet wheels 40 with teeth 41 on their circumferences, while the detent is provided in the form of a ratchet 42 extending horizontally across the two locking ratchet wheels. The opposite ends of the ratchet 42 are pivotally supported in sectorial apertures 43 by suitable means on the respective side flanges 3. An actuator rod or pin 44 projects upwardly from the midpoint of the ratchet 42 with respect to its longitudinal dimension, normally for abutting contact with the spherical inertial element 20 within the housing 19 of the acceleration sensing means 18. Instead of the leaf spring 17 in the preceding embodiments, there is provided a helical tension spring 45 stretched between the top plate 4 and the ratchet 42 to bias the same toward its operative position. Alternatively, the tension spring 45 may be replaced by suitable magnetic attraction means.

Normally, the ratchet 42 is held out of engagement with the locking ratchet wheels 40 against the bias of the tension spring 45 by the inertial element 20 in contact with the actuator pin 44. Upon displacement of the inertial element 20 in the event of a sudden change in movement or direction of the vehicle, the ratchet 42 is pivoted by the force of the tension spring 45 to its operative position and thus engages between two adjacent teeth 41 on each ratchet wheel 40. The drum 6 is thereupon locked against rotation in its belt unwinding direction. Other details of organization and operation are similar to those of the retractor shown in FIGS. 1 and 2.

Figure 5:
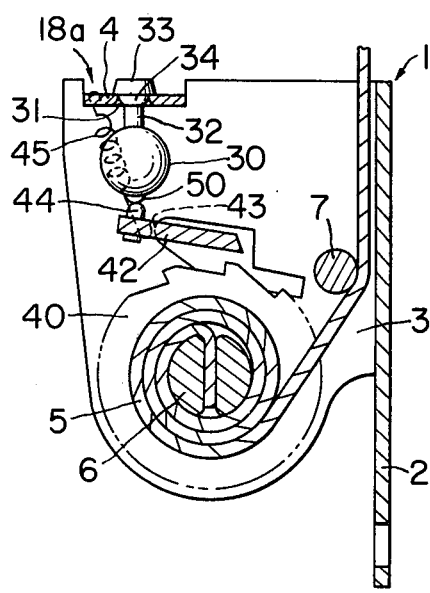

FIG. 5 illustrates a further embodiment of the invention which in essence is a combination of the pendulum-type acceleration sensing means 18a shown in FIG. 3 and the ratchet-type locking mechanism shown in FIG. 4. The operation of this emergency locking retractor will be apparent from the foregoing description relating to FIGS. 1 to 4. It should be noted, however, that this retractor incorporates a major improvement absent from the preceding examples.

The improvement resides in a relatively small convexity 50 formed on the bottom part of the spherical inertial element 30. The convexity 50 is normally held in contact with the actuator pin 44 projecting from the ratchet 42. This arrangement is advantageous in that the ratchet 42 can be actuated by a slight displacement of the inertial element 30. The emergency locking mechanism of the retractor is therefore highly responsive to vehicle acceleration.

Figure 6:
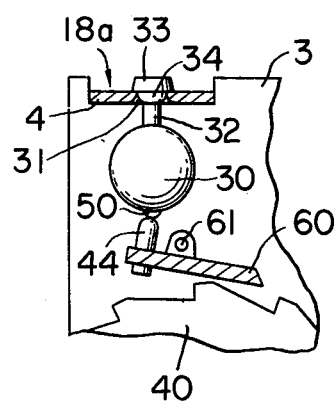
FIG. 6 is a fragmentary view similar in section to FIG. 2 but showing a slight modification of the example shown in FIG. 5.

FIG. 6 illustrates a slight modification of the preceding example illustrated in FIG. 5 which dispenses with the helical tension spring 45. A ratchet 60 extending horizontally across the two locking ratchet wheels 40 is pivotally supported at its opposite ends by pins 61 projecting from the respective side flanges 3. The pins 61 support the ratchet 60 off balance with respect to its transverse direction in order that the ratchet may be biased into engagement with the pair of locking ratchet wheels 40 by its own weight. Normally, however, the ratchet 60 is held out of engagement with the ratchet wheels by the actuator pin 44 projecting upwardly therefrom for abutting contact with the convexity 50 on the spherical inertial element 30 of the pendulum-type acceleration sensing means 18a. Other details will be apparent from the foregoing description of the preceding examples.

Figure 7:
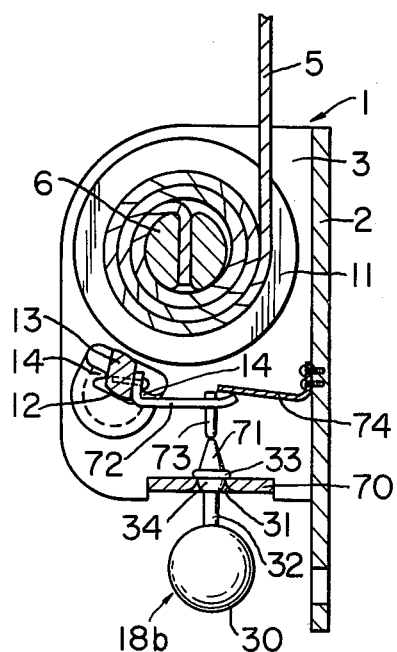
FIG. 7 is a view similar to FIG. 2 but showing a further embodiment of the invention.

FIG. 7 illustrates a further embodiment of the invention which is designed to be unresponsive to vehicle accelerations in the vertical direction. This retractor is constituted of essentially the same parts as those of the FIG. 3 embodiment but differs therefrom in that its pendulum-type acceleration sensing means 18b is arranged below the drum 6.

The retractor frame 1 has a bottom plate 70, instead of the top plate 4 of the preceding examples, which is secured to the bottom edges of the side flanges 3. The bottom plate 70 has the bore 31 with the chamfered bottom edge. The spherical inertial element 30 of the pendulum-type acceleration sensing means 18b has the arm 32 rigidly coupled to the flange 33 via the connector 34 that is relatively neatly fitted in the bore 31. The flange 33, resting on the bottom horizontal member 70, has a conical member 71 fixedly mounted thereon.

An actuator rod 72 affixed at one end to the detent 13 has a downward projection 73 at the other end, and a leaf spring 74 extending from the back plate 2 engages the actuator rod 72 to bias the detent 13 toward its operative position in which the detent comes into contact with the circumferences of both locking wheels 11. Normally, however, the detent 13 is held in its illustrated inoperative position against the bias of the leaf spring 74 by the actuator rod projection 73 resting on the top of the conical member 71.

When the inertial element 30 swings away from its normal position as a result of vehicle acceleration in the horizontal direction, the conical member 71 inclines in the opposite direction to the direction of the swing of the inertial element. Since then the actuator rod projection 73 slides down the conical member 71, the detent 13 is urged by the leaf spring 74 via the actuator rod 72 to pivot into contact with the circumferences of the locking wheels 11. The drum 6 is thus locked against rotation in the belt unwinding direction. When the vehicle stops accelerating, the inertial element 30 returns to its normal position of rest while causing the actuator rod projection 73 to slide up the conical member 71 to its top against the force of the leaf spring 74. The detent 13 then pivots back to its illustrated inoperative position.

The inertial element 30 jumps up and strikes against the bottom plate 70 at the time of a brief vehicle acceleration in the upward direction. Although the actuator rod projection 73 may be pressed upwardly by the conical member 71, the detent 13 does not move into contact with the locking wheels 11 by the resulting movement of the actuator rod 72. At the time of a brief vehicle acceleration in the downward direction, on the other hand, the inertial element 30 remains in its normal position of rest, so that the drum 6 also is held unlocked. The emergency locking mechanism of this retractor is therefore unresponsive to vehicle accelerations in the vertical direction which may be caused, for example, by jolting of the vehicle.

Figure 8:
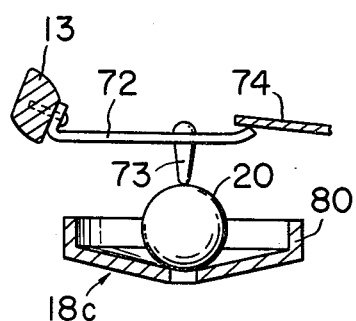
FIG. 8 is a partial vertical sectional view showing a modification of acceleration sensing means of the type shown in FIGS. 1, 2, and 4, the modified acceleration sensing means being suitable for use in the retractor shown in FIG. 7.

As illustrated in FIG. 8, the acceleration sensing means of the type shown in FIGS. 1, 2 and 4 also adaptable for use with the emergency locking mechanism unresponsive to vertical vehicle accelerations. The spherical inertial element 20 of the modified acceleration sensing means 18c is contained in an open-top housing 80 having a conical bottom. The downward projection 73 of the actuator rod 72 is normally urged by the leaf spring 74 into abutting contact with the inertial element 20 through the open top of the housing 80. It will now be apparent that this acceleration sensing means 18c can be used to replace the means 18b in the retractor shown in FIG. 7. The operation of the acceleration sensing means 18c, and of the complete retractor incorporating the same, will also be apparent from the foregoing description relating to FIG. 7.

Figure 9:
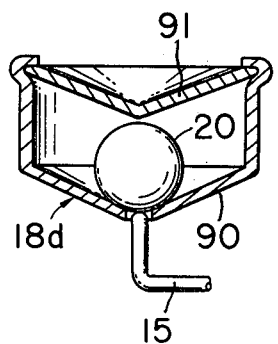
FIG. 9 is a view similar to FIG. 8 but showing another modification of the acceleration sensing means intended for use in the retractor shown in FIGS. 1 and 2.

Another modified acceleration sensing means 18d shown in FIG. 9 can be employed in place of the acceleration sensing means 18 in the arrangement of FIGS. 1 and 2 in order to render the emergency locking mechanism of this first embodiment unresponsive to vertical vehicle accelerations. The spherical inertial element 20 of this acceleration sensing means 18d is contained in a housing 90 having not only the conical bottom but also a conical top 91. The conical top 91 of the housing 90 may be formed by part of the top plate or horizontal member 4 of the retractor frame 1, as will be understood by referring back to FIGS. 1 and 2. Since the inertial element 20 is restrained from upward displacement by the conical top 91, the detent 13 is not pivoted to its operative via the actuator rod 15 by vertical vehicle accelerations.

Figure 10:
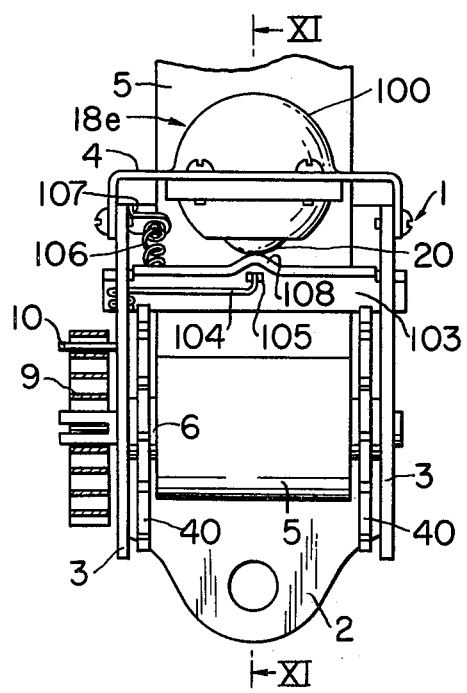
FIG. 10 is a front elevational view of a further example of a retractor according to the invention, in a preferred embodiment in which the spiral spring is shown in vertical section.
Figure 11:
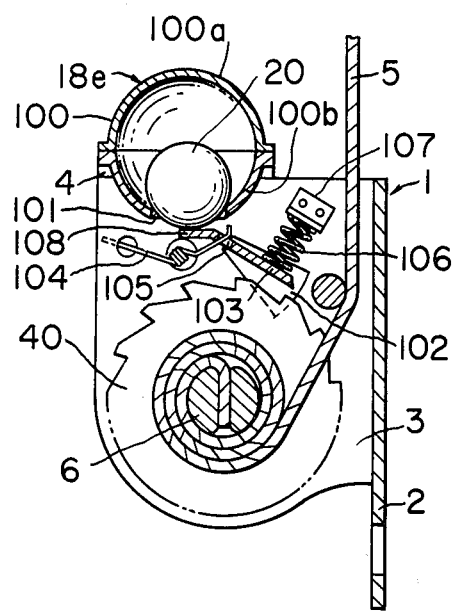
FIG. 11 is a side view in section taken along the plane of line XI—XI in FIG. 10 as viewed in the arrow direction.

FIGS. 10 and 11 illustrate a preferred embodiment of the invention incorporating a ratchet locking mechanism of the type shown in FIG. 4 or 5, in combination with a further modified example of acceleration sensing means 18e that is calculated to minimize noise and wear or damage of its working parts.

The acceleration sensing means 18e comprising the spherical inertial element 20 and a housing 100 having a spherical internal surface. The housing 100 may consist of top and bottom halves 100a and 100b suitably secured together and mounted in position on the top plate 4 of the retractor frame 1. The bottom half of the housing 100 has a circular aperture 101 which is located centrally and which is less in diameter than the inertial element 20, and this inertial element may partly project downwardly out of the aperture 101.

The ratchet mechanism of this retractor illustrated in FIGS. 10 and 11 also incorporates some minor improvements or modifications. A pair of sectorial apertures 102 are formed in the respective side flanges 3 in horizontally registered relationship for receiving the opposite ends of a ratchet 103. A torsion spring 104 extending from one of the side flanges 3 engages the ratchet 103 by entering a small opening 105 formed centrally with respect to its longitudinal dimension. The ratchet 103 is urged by this spring 104 against the apexes of the sectorial apertures 102, practically against any possibility of displacement due to its own weight or to vehicle acceleration. It will also be understood that the ratchet 103 is pivotable about a longitudinal axis extending through the apexes of the sectorial apertures 102.

A helical compression spring 106 is interposed between the ratchet 103 and a spring retainer 107 secured to one of the side flanges 3. Thus, as in the preceding embodiments of the invention, the ratchet 103 is biased toward its operative position where the ratchet engages the pair of locking ratchet wheels 40. The ratchet 103 has a tongue 108 located centrally with respect to its longitudinal dimension. Normally, the tongue 108 is held in abutting contact with the inertial element 20 partly projecting out of the aperture 101 in the housing 100 so that the ratchet 103 is retained in its illustrated inoperative position against the bias of the compression spring 106. It will now be apparent that the tongue 108 of the ratchet 103 functions as the actuator.

A sudden change in movement or direction of the vehicle will cause the inertial element 20 to move away from its normal position of rest and to roll over the spherical internal surface of the housing 100. The ratchet 103 will then be pivoted by the force of the compression spring 106 into engagement with the ratchet wheels 40 thereby locking the drum 6 against rotation in its belt unwinding direction.

It will be appreciated that, thanks to the spherical internal surface of the housing 100, the inertial element 20 does not collide with the housing when the vehicle is subjected to any degree of acceleration in excess of a predetermined limit in any horizontal direction. Since then the inertial element merely revolves within the housing in rolling contact with its internal surface, no great noise is produced, nor is the housing worn or damaged prematurely.

For best results, the inertial element 20 should be made of lead, lead-base alloy or like material which has great mass, and which readily absorbs the energy of shocks. The housing 100 should also be made of hard rubber, plastics or like material which readily absorbs impact energy. The acceleration sensing means 18e will then not easily respond to the usual jolts of the vehicle, and the inertial element 20, once displaced, will smoothly return to its normal position of rest within the housing 100.

Figure 12:
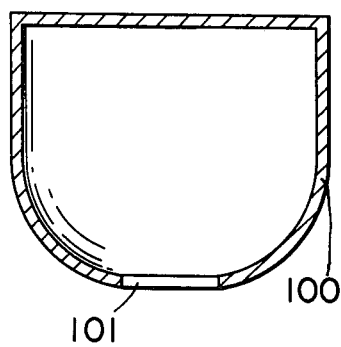
FIG. 12 is a vertical section showing a modification of a housing of acceleration sensing means used in the example shown in FIG. 11.

It should be understood that notwithstanding the showing of FIG. 11, the internal surface of the housing 100 need not be exactly spherical in shape. Slight deviations from the true sphere are permissible provided that collision of the inertial element with the housing as a result of horizontal vehicle accelerations is avoided. Also, the housing 100 may be provided in the form of an upright, hollow cylinder having a semispherical bottom portion as shown in FIG. 12. If the cylindrical portion of this housing has sufficient height, the inertial element when displaced as a result of a horizontal vehicle acceleration will return to its normal position of rest without colliding with the top or any other part of the housing. The term "substantially spherical" as used herein or in the appended claims should therefore be understood to include all such modifications.

Figure 13:
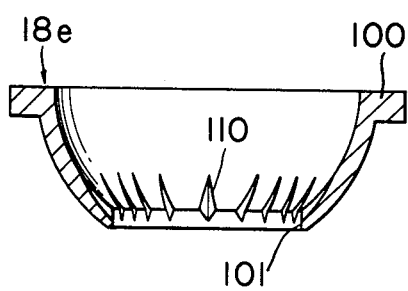
FIG. 13 is a partial vertical sectional view of a further modification of the housing of the acceleration sensing means shown in FIGS. 10 and 11.

FIG. 13 illustrates a slight modification of the acceleration sensing means 18e shown in FIGS. 10 and 11. It is possible for the spherical inertial element 20 of this acceleration sensing means to start revolving in a horizontal plane within the housing 100 as a result of vehicle acceleration, and then it may take several seconds before the inertial element falls back to the circular aperture 101 in the housing. This can be prevented by forming a number of grooves 110 on the internal surface of the housing 100 so as to surround the aperture 101. In this manner the inertial element will quickly return to its normal position of rest because the grooves 110 serve to attenuate the rolling energy of the element. It should be understood, however, that the arrangement illustrated in FIG. 12 is purely by way of example, for the same objective can obviously be accomplished by other kinds of surface irregularities formed on the internal surface of the housing 100 around the aperture 101.

FIGS. 14 through 18 illustrate another example of the invention which in essence is a combination of a ratchet locking mechanism of the type shown in FIG. 4 or 5 or in FIGS. 10 and 11 and the acceleration sensing means 18e shown in FIGS. 10 and 11. In this example, however, the drum 6 is arranged vertically, in contrast to the horizontal arrangement of the drum in all of the preceding embodiments of the invention. The vertical drum arrangement is sometimes preferable to facilitate the manipulation of the seat belt 5 out of or back into the retractor by the occupant of the seat.

Figure 14:
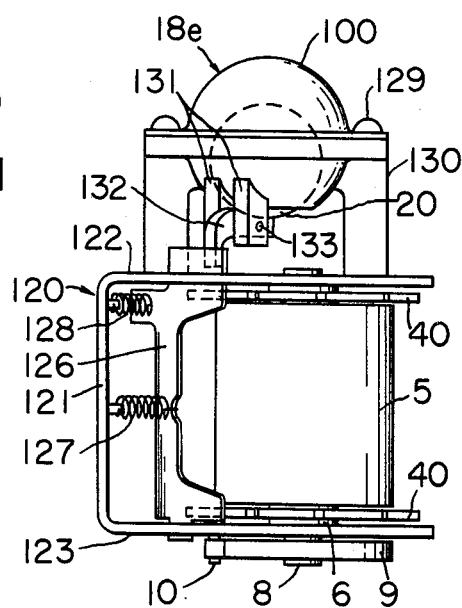
FIG. 14 is a front elevational view of a further example of the retractor according to the invention.

Referring more specifically to FIG. 14 in particular, the illustrated seat belt retractor is shown to have a recumbent U-shaped frame 120 comprising of a vertical web 121 and horizontal top and bottom flanges 122 and 123. The drum 6 having the seat belt 5 wound thereon is fixedly mounted on the shaft 8 extending vertically between and rotatably journaled in the top and bottom flanges 122 and 123. The lower end of the drum shaft 8 projects out of the bottom flange 123, and the spiral spring 9 engages the projecting end of the drum shaft to bias the drum 6 in its belt winding direction. The pair of locking ratchet wheels 40 with the teeth 41 on their circumferences are mounted coaxially and fixedly on the drum shaft 8 for unitary rotation with the drum 6.

Figure 15:
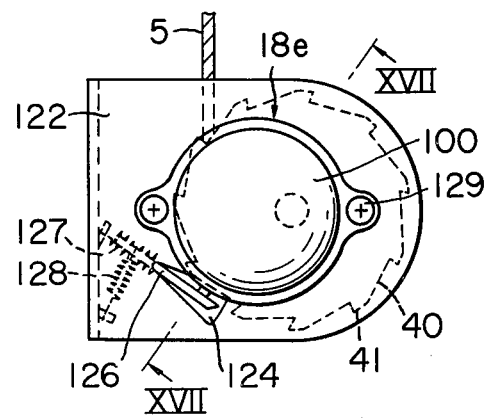
FIG. 15 is a top plan view of the retractor shown in FIG. 14.
Figure 16:
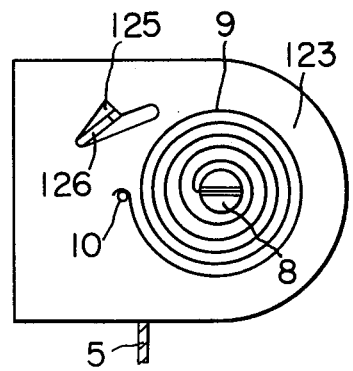
FIG. 16 is a bottom view of the retractor shown in FIGS. 14 and 15.

As shown in the top and bottom plan views of FIGS. 15 and 16, the top and bottom flanges 122 and 123 have a vertically registered pair of sectorial apertures 124 and 125 for receiving the opposite ends of a ratchet 126, which slightly differs in shape from the ratchet 103 of the example illustrated in FIGS. 10 and 11. The ratchet 126 is thus arranged vertically, parallel to the axis of the drum 6. The top end of the ratchet 126 projects out of the aperture 124 in the top flange 122 for purposes later described.

A helical tension spring 127 stretched from the vertical web 121 engages the ratchet 126 at the midpoint of its longitudinal dimension thereby urging the latter against the apexes of the sectorial apertures 124 and 125, practically against any possibility of displacement due to its own weight or to vehicle acceleration. The ratchet 126 is pivotable about a vertical axis passing through the apexes of the sectorial apertures, as indicated by the line A—A in FIG. 18. Another helical tension spring 128 stretched from the vertical frame member 121 also engages the ratchet 126 to bias the latter to its operative position where the ratchet engages the pair of ratchet wheels 40 to lock the drum 6 against rotation in its belt unwinding direction.

Figure 17:
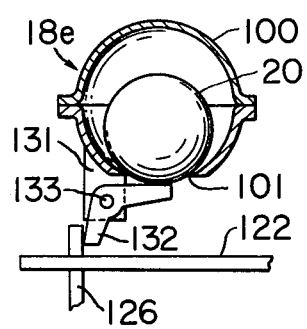
FIG. 17 is a schematic sectional view taken substantially along the plane of line XVII—XVII in FIG. 15.

The housing 100 of the acceleration sensing means 18e is fastened as by screws 129 to a mount 130 which in turn is securely supported on the U-shaped frame 120. As illustrated in FIGS. 14 and 17, the housing 100 has a pair of arms 131 extending downwardly therefrom, and the actuator in the form of a bell crank 132 is pivotally supported by a pin 133 between these arms. The bell crank 132 is arranged substantially at right angle to the plane of the ratchet 126. Normally, the bell crank 132 has one of its arms held in abutting contact with the top end of the ratchet 126 projecting out of the sectorial aperture 124 in the top flange 122, and the other arm urged against the spherical inertial element 20 partly exposed through the bottom aperture 101 of the housing 100. Thus, as in all of the preceding embodiments of the invention, the ratchet 126 is normally held in its illustrated inoperative position against the bias of the tension spring 128.

Figure 18:
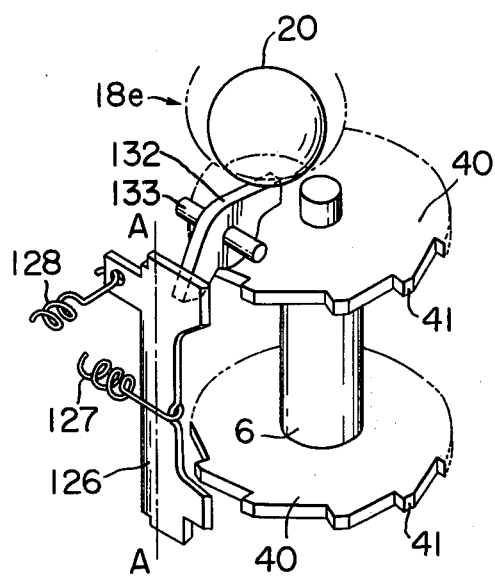
FIG. 18 is a schematic perspective view showing some essential parts of the retractor shown in FIGS. 14 through 17.

As will be best understood from the schematic diagram of FIG. 18, the bell crank 132 will swing counterclockwise, as viewed in this figure, upon displacement of the inertial element 20 from its normal position of rest in the event of a sudden change in movement or direction of the vehicle. The ratchet 126 will then be swung by the force of the tension spring 128 into engagement with both ratchet wheels 40 thereby locking the drum 6 against rotation in its belt unwinding direction, which is clockwise as viewed in FIG. 15.

Desirably, the minimum vehicle acceleration capable of causing displacement of the inertial element 20 from its normal position of rest within the housing 100 should be practically constant in any horizontal direction in which the acceleration can take place. That is to say, the acceleration sensing means 18e should be omnidirectional in its response. To this end, the ratchet 126 is so constructed and arranged that its center of gravity lies substantially on the axis of rotation A—A (FIG. 18). By this provision, the inertial forces acting upon the ratchet 126 as a result of vehicle acceleration in any horizontal direction will then be equal on both side of the ratchet with respect to the axis A—A, and surplus moment due to application of acceleration will not be produced, so that the directivity of the response of the means 18e can be eliminated.

In the retractor shown in FIGS. 14 through 18, the drum 6 is adapted to rotate about a vertical rotational axis. However, the drum 6 may be arranged to have an inclined rotational axis by suitably modifying the angle formed between the two arms of the bell crank 132.

Figure 19:
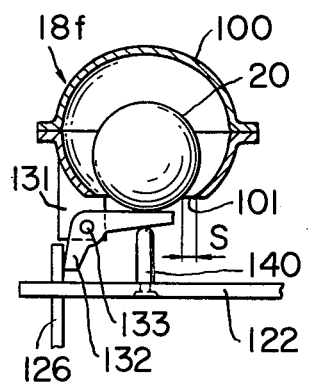
FIG. 19 is a view similar to FIG. 17 but showing a modification of the retractor shown in FIGS. 14 through 18.

FIG. 19 illustrates a slight modification of the example illustrated in FIGS. 14 to 18 including acceleration sensing means 18f designed to be significantly less responsive to the usual jolts or vibrations of the vehicle than the means 18e of the preceding example. A limit stop in the form of a pin 140 projects upwardly from the top flange 122 of the U-shaped frame 120 for abutting contact with one of the arms of the bell crank 132 immediately underlying the spherical inertial element 20 of the acceleration sensing means 18f.

The height of the pin 140 with respect to the bell crank 132 and the acceleration sensing means 18f is such that, normally, the inertial element 20 rides freely over the said one arm of the bell crank, with a clearance of 2S in the horizontal direction between the inertial element and the inner rim edge of the housing 100 bounding the circular aperture 101. It is of course understood that while the inertial element 20 is thus riding freely over the one arm of the bell crank 132 by gravity, the other arm of the bell crank is held in abutting contact with the ratchet 126 to hold the same in its inoperative position against the bias of the tension spring 128, as will be seen by referring back to FIG. 18.

The above noted clearance normally existing between the inertial element 20 and the housing 100 is highly effective for rendering the acceleration sensing means 18f substantially unresponsive to the ordinary vibrations of the vehicle. This is because the ordinary vehicle vibrations in the horizontal direction act less upon the inertial element riding freely over the bell crank 132 than in the case where the inertial element is neatly received in the circular aperture 101 in the housing. The acceleration sensing means 18f will be particularly unresponsive to vehicle vibrations whose amplitude is not more than the clearance of 2S. Even in the event the amplitude of the vehicle vibrations exceeds the clearance, the acceleration sensing means 18f will not easily respond because such vibrations will act upon the inertial element 20 for a shorter length of time owing to the presence of the clearance.

It has been experimentally confirmed that the number of times the emergency locking retractor incorporating the acceleration sensing means 18f operates erroneously in response to ordinary vehicle vibrations can be decreased to one third that of the example illustrated in FIGS. 14 to 18 if the clearance of 2S is set at 2 millimeters in the acceleration sensing means 18f having a spherical inertial element 20 of 25 millimeters in diameter. While in FIG. 19 the pin 140 is shown to be employed for limiting the normal position of the bell crank 132 in order that the inertial element 20 may ride freely thereover, it will be apparent that the same objective can be accomplished by limiting the normal or inoperative position of the ratchet 126 by suitable means. In the latter case, of course, the pin 140 can be dispensed with.

Having thus described the emergency locking seat belt retractor according to the invention, it is believed that the many objects for which it was designed, either explicitly stated or otherwise, have been accomplished in a simple and thoroughly practicable manner. It is to be understood, however, that the invention itself is not to be limited by the exact showing of the accompanying drawings or the description thereof but is inclusive of various modifications or changes.

What is claimed is:

1. An emergency locking retractor for a seat belt of a vehicle comprising, in combination: a frame adapted to be secured to the vehicle; a drum rotatably supported by said frame and having one end of the belt anchored thereto for winding and unwinding the same, said drum having an axis of rotation oriented at an angle other than zero relative to the horizontal; first biasing means for causing said drum to rotate in the belt winding direction; a locking wheel rotatable in unison with said drum; detent means pivotable about an axis parallel to the axis of drum rotation between an operative position where said detent means engages said locking wheel to lock said drum against rotation in the belt unwinding direction, and an inoperative position where said detent means is disengaged from said locking wheel; second biasing means for biasing said detent means from the inoperative toward the operative position; acceleration sensing means including an inertial element normally held in a predetermined position so as to be displaceable relative to said frame in response to acceleration of the vehicle; and actuator means interposed between said sensing means and said detent means and having a first end disposed under said inertial element to be urged downwardly thereby, and a second end disposed for abutting contact with said detent means to hold the latter in the inoperative position against the bias of said second biasing means; said actuator means including a mechanism for converting upward displacement of said first end in response to displacement of said inertial element into a displacement of said second end in a direction which is substantially the direction from the inoperative toward the operative position of said detent means and which is different from that of the displacement of said first end, whereby upon displacement of said first end, said second end permits said detent means to move from the inoperative to the operative position under the bias of said second biasing means.

2. The retractor as defined in claim 1, wherein the axis of drum rotation is oriented vertically.

3. The retractor as defined in claim 1, wherein said sensing means includes a housing having a substantially spherical internal surface with a circular aperture located centrally at its bottom, said inertial element is a spherical ball displaceably mounted within said housing, and said aperture has a smaller diameter than said inertial element, whereby the latter rests normally over said aperture.

4. The retractor as defined in claim 3, further comprising stop means supporting thereon said first end of the actuator means to determine the normal position of said first end in such a manner that said inertial element normally rides freely on said first end, with a clearance between said inertial element and an edge of said housing bounding said aperture.

5. The retractor as defined in claim 1, wherein said actuator means is in the form of a pivotable bell crank having two mutually angularly disposed arms, and said first and said second ends are on said arms, respectively.

6. The retractor as defined in claim 5, wherein said sensing means further includes a housing having a substantially spherical internal surface with a circular aperture located centrally at its bottom, said inertial element is a spherical ball displaceably mounted within said housing, and the latter is rigidly mounted on said frame and has means pivotally supporting said bell crank.

* * * * *